(12) United States Patent
Fronczak et al.

(10) Patent No.: US 11,647,310 B1
(45) Date of Patent: May 9, 2023

(54) IMAGE SENSOR AND METHOD FOR OPERATING AN IMAGE SENSOR

(71) Applicant: ams Sensors USA Inc., Plano, TX (US)

(72) Inventors: Kevin Fronczak, Fairport, NY (US); David Sackett, Webster, NY (US); Adi Xhakoni, Kessel Lo (BE)

(73) Assignee: ams Sensors USA Inc., Plano, TX (US)

( * ) Notice: Subject to any disclaimer, the term of this patent is extended or adjusted under 35 U.S.C. 154(b) by 0 days.

(21) Appl. No.: 17/711,088

(22) Filed: Apr. 1, 2022

(51) Int. Cl.
*H04N 25/77* (2023.01)
*H04N 25/75* (2023.01)
*H04N 25/616* (2023.01)
*H04N 25/772* (2023.01)

(52) U.S. Cl.
CPC ........... *H04N 25/75* (2023.01); *H04N 25/616* (2023.01); *H04N 25/772* (2023.01)

(58) Field of Classification Search
None
See application file for complete search history.

(56) References Cited

U.S. PATENT DOCUMENTS

| | | |
|---|---|---|
| 8,508,629 B2 | 8/2013 | Mo et al. |
| 2005/0243193 A1 | 11/2005 | Gove et al. |
| 2017/0280086 A1 * | 9/2017 | Chao ..................... H04N 25/445 |

* cited by examiner

*Primary Examiner* — Mark T Monk
(74) *Attorney, Agent, or Firm* — Viering, Jentschura & Partner mbB (57) ABSTRACT

An image sensor includes a pixel array including a plurality of pixels each including a photosensitive element, and a readout circuit, wherein the pixels are arranged in at least two columns, within each column at least some of the pixels of the column are connected with a common column bus, respectively, for each column the readout circuit includes a first analog-to-digital converter (ADC) and a second ADC, for each column the first ADC is connected with the column bus, and for each column the second ADC is connectable with at least one of the column bus and a reference potential or the second ADC is connected with one optically shielded pixel of the pixel array.

20 Claims, 9 Drawing Sheets

IMAGE SENSOR AND METHOD FOR OPERATING AN IMAGE SENSOR

FIELD

Various embodiments of the present disclosure relate to an image sensor and a method for operating an image sensor.

BACKGROUND

Image sensors usually comprise an array of unit elements, called pixels. The array of pixels is exposed to radiation during an exposure period and, subsequently, the signal value of each pixel is read from the array. Pixel signals are analog signals. An analog-to-digital converter (ADC) is provided to convert the analog pixel signal into a digital signal. Ramp based ADCs are widely used due to their limited number of column circuitry, and small die size.

In the readout process different sources of noise are present. One example is row-noise which is the same for an entire row of pixels. This is why it is easily observable by humans. Row noise can be eliminated by employing additional columns with pixels that are not illuminated. The signals from the additional pixels are averaged and subtracted from the signals of the active pixels. These additional pixels however lead to a significantly increased number of required pixels and thus an increased size of the image sensor. The achieved reduction in noise is proportional to the square root of the number of additional pixels. This means, for example 100 additional columns of dark pixels are required for a reduction of the noise by a factor of 10. This increase in size might not be desired in image sensors for applications requiring small image sensors.

SUMMARY

According to at least one embodiment of an image sensor, the image sensor comprises a pixel array comprising a plurality of pixels each comprising a photosensitive element. This means, each pixel comprises a photosensitive element. The photosensitive elements can each be configured to accumulate charge carriers by converting electromagnetic radiation. For example, the photosensitive elements are each a photodiode, in particular a pinned photodiode. Photodiodes are configured to detect electromagnetic radiation. The pixels of the pixel array can be arranged in a two-dimensional arrangement. The pixels of the pixel array can be arranged in a plurality of columns and a plurality of rows.

The image sensor further comprises a readout circuit. The readout circuit is connected with the pixels of the pixel array. The readout circuit can be configured to read out signals detected by the pixels of the pixel array. This can mean, that during operation of the image sensor charge carriers accumulated by the pixels are transferred to the readout circuit. In this way, for example the intensity of electromagnetic radiation detected by the image sensor can be determined.

The pixel array comprises at least two columns of pixels. This can mean, that the pixels are arranged in a two-dimensional array comprising at least two columns. Within each column pixels are arranged along a line. The at least two columns can extend parallel to each other.

Within each column at least some of the pixels of the column are connected with a common column bus, respectively. This can mean, that each column comprises one column bus. The column bus can in each case be configured to transmit electrical charges and/or data. For each column at least some of the pixels of this column are connected with the column bus of this column. The pixels that are connected with a column bus can be connected with the column bus separately. Thus, the pixels of one column can be connected with each other exclusively via the column bus. The column bus can extend along the respective column. Each column bus can be connected with the readout circuit.

For each column the readout circuit comprises a first analog-to-digital converter (ADC) and a second ADC. This can mean, that in total two ADCs are assigned to each column. One first ADC and one second ADC can be assigned to each column, respectively. Each first ADC and each second ADC can exclusively be assigned to one of the columns. Thus, the columns do not share ADCs. Each ADC can comprise a comparator.

For each column the first ADC is connected with the column bus. This means, for each column the first ADC that is assigned to this column is connected with the column bus of this column. For each column an input of the first ADC can be connected with the column bus.

For each column the second ADC is connectable with at least one of the column bus and a reference potential or the second ADC is connected with one optically shielded pixel of the pixel array. That a second ADC is connectable with another component can mean that the second ADC is connected with that component via a switch. For each column the second ADC can be connectable with the column bus of the column or with the reference potential or with both. For each column an input of the second ADC can be connectable with the column bus of the column or with the reference potential or with both. Alternatively it is possible that the second ADC is connected with one optically shielded pixel of the pixel array for each column. An input of the second ADC can be connected with one optically shielded pixel of the pixel array for each column. That a pixel is optically shielded can mean that electromagnetic radiation is prevented from entering the pixel. An optically shielded pixel can be shielded from electromagnetic radiation. A pixel can be optically shielded by for example covering the pixel with an opaque material. A signal detected by an optically shielded pixel comprises thermal noise.

Features disclosed for one column in the following are also disclosed for more than one column or for all columns of the pixel array.

The image sensor described herein can be employed to reduce noise, in particular row noise. This can be achieved in three different ways.

For the case that for each column the second ADC is connectable with the column bus, the second ADC is connected with the column bus via a switch. In this case at least one pixel of the column is optically shielded. For each column of the pixel array at least one pixel of the column can be optically shielded. The second ADC in this case is employed to read out the signal of the at least one optically shielded pixel. As no electromagnetic radiation enters the optically shielded pixel, this pixel only detects noise, in particular row noise. Once the switch between the column bus and the second ADC is closed, the charges accumulated by the optically shielded pixel can be transferred to the second ADC via the column bus. In this way, the optically shielded pixel is read out. This principle can also be employed for more than one optically shielded pixel per column. After the readout of the optically shielded pixel, the switch is opened so that the second ADC is disconnected from the column bus. In a next step, at least one pixel of the column is read out. This pixel is exposed to radiation. Electric charges accumulated by the pixel to be read out are transferred to the first ADC via the column bus. Both the first ADC and the second ADC convert the received signals into digital signals. After the conversion the signal detected by the optically shielded pixel is subtracted from the signal detected by the pixel that is exposed to radiation. In this way, noise is removed from the signal detected by the pixel exposed to radiation. Since the signal provided by an optically shielded pixel can be detected and monitored in this way, it can be advantageously possible to track the variation of the signal detected by the optically shielded pixel, for example for different temperatures.

Another possibility to remove noise is that for each column the second ADC is connectable with the reference potential. This can mean, that the second ADC is connected with the reference potential via a switch. Once the switch is closed the voltage level of the reference potential is applied to the input of the second ADC. This signal is then converted into a digital signal by the second ADC. The signal provided by the second ADC can then be subtracted from a digital signal provided by the first ADC as described above. Also in this way noise is removed from the signal detected by a pixel exposed to radiation. Advantageously, no additional pixels are required for the pixel array. Thus, the pixel array can have a compact size. The reference potential can be employed instead of an optically shielded pixel for the case that the noise detected by an optically shielded pixel is small or if it is not required to detect pixel noise that is detectable with an optically shielded pixel.

Another possibility is that for each column the second ADC is connectable with the column bus and the reference potential. In this case the second ADC is connected with the column bus via a switch and the column bus is connected with the reference potential via a further switch. Once the two switches are closed, the second ADC can receive a signal that is the sum of a signal detected by an optically shielded pixel and the reference potential level. Since the reference potential level is known, also in this case noise can be removed from the signal provided by the first ADC.

Another possibility to remove noise is that the second ADC is connected with at least one optically shielded pixel of the pixel array. In this case, the second ADC is directly connected with the optically shielded pixel. The optically shielded pixel is not connected with the column bus. During readout charges accumulated by the optically shielded pixel can be transferred to the second ADC. At the same time signals detected by at least one pixel exposed to radiation can be transferred to the first ADC via the column bus. By subtracting the signal provided by the second ADC from the signal provided by the first ADC, noise is removed from the signal detected by the pixel that is exposed to radiation. This is also possible for more than one optically shielded pixel per column.

For these different possibilities to remove noise from a detected signal only a small number of additional pixels that are not exposed to radiation or no additional pixels are required. For the case that optically shielded pixels are employed, it is sufficient to have one optically shielded pixel per column or one row of optically shielded pixels. The optically shielded pixels of different columns can be arranged within one row of the pixel array. It is also possible that the pixel array comprises more than one row of optically shielded pixels. If the second ADC is only connectable to the reference voltage, no optically shielded pixels are required. This means, the size of the pixel area of the image sensor can be smaller than for image sensors where several columns or rows of optically shielded pixels are employed for removing noise. Therefore, the image sensor can have a compact setup.

Different possibilities described herein can have in common that noise arising from impacts of a ramp signal provided to ADCs of the readout circuit, for example the first ADCs, and noise arising from other components that are shared by the first ADCs and the second ADCs is transferred to the second ADCs and in a next step subtracted from the signals provided by the first ADCs. This means, for each column one or more ramp signals are provided to the first ADC and the second ADC. Furthermore, the first ADC and the second ADC share certain components for each column, as for example the connection to a column bus. Noise generated by these components that are connected to both the first ADC and to the second ADC is transferred to the second ADC. After the conversion into a digital signal this noise can be subtracted from the digital signal provided by the first ADC. In this way, the noise provided by these components is removed. Noise added by these components, this means the component providing the ramp signal and other components of the readout circuit that are shared by the first and second ADCS, adds to the row noise. Removing this noise thus reduces the row noise. Advantageously, as described above for removing the noise only one optically shielded pixel is required per column or no additional pixels are required. Thus, with the image sensor described herein noise, in particular row noise, can be reduced in an efficient way.

According to at least one embodiment of the image sensor, within each column at least one pixel is optically shielded. This means, at least one pixel of each column is optically shielded. The pixels that are optically shielded can be arranged within one row of the pixel array. The pixels that are optically shielded can be connectable with each other. This can mean, that the pixels that are optically shielded can be connected with each other via at least one switch. For example, for each column a switch is arranged between the column bus and the second ADC. For each column a connection node can be arranged between the switch and the second ADC. The connection nodes of the different columns can be connected with each other. Another possibility is that for each column between the reference potential and the second ADC a switch is arranged. For each column a connection node can be arranged between the switch and the second ADC. The connection nodes of the different columns can be connected with each other. Another possibility is that for each column the second ADC is connected with one optically shielded pixel of the pixel array. In this case for each column between the second ADC and the optically shielded pixel a connection node can be arranged. The connection nodes of the different columns can be connected with each other. For each of these possibilities the signals transferred to the second ADCs are averaged between the columns of the pixel array. Since the signals that are transferred to the second ADCs comprise noise, the noise is averaged for the columns of the pixel array. This noise value can be subtracted from the signals obtained from pixels that are exposed to radiation. In this way, noise during readout of the pixels that are exposed to radiation is reduced.

According to at least one embodiment of the image sensor, the optically shielded pixels are arranged in a row of the pixel array. This can mean, that the optically shielded pixels are arranged in only one row of the pixel array. Therefore, advantageously only one additional row of pixels is required for reducing the noise during readout.

According to at least one embodiment of the image sensor, for each column the first ADC comprises a comparator with a first input and a second input and the second ADC comprises a comparator with a first input and a second input. The comparators can each be configured to compare a voltage level applied to the first input of the respective comparator with a voltage level applied to the second input of the respective comparator. In this way, analog signals, as signals detected by the pixels, can be converted into digital signals. The first input of the comparator of the first ADC can be a first input of the first ADC. The second input of the comparator of the first ADC can be a second input of the first ADC. The first input of the comparator of the second ADC can be a first input of the second ADC. The second input of the comparator of the second ADC can be a second input of the second ADC.

According to at least one embodiment of the image sensor, for each column the first input of the comparator of the first ADC and the first input of the comparator of the second ADC are connected with a ramp potential via a switch. This can mean that the switch is arranged between the ramp potential and the first input of the comparator of the first ADC and the switch is arranged between the ramp potential and the first input of the comparator of the second ADC. The ramp potential can be a potential whose voltage level can be changed. The ramp potential can comprise a generator. The ramp potential can be configured to provide a ramp signal. In this way, a changing voltage level can be applied to the first inputs and the comparators of the ADCs can compare the changing voltage level to the signals provided by the pixels. With this, the analog signals provided can be converted into digital signals. For each column the first input of the comparator of the first ADC and the first input of the comparator of the second ADC can also be connected with a further ramp potential via a switch. The further ramp potential can provide a ramp signal up to a reference voltage level. During operation of the image sensor, the first inputs can be either connected with the ramp potential or with the further ramp potential or with none of these two potentials. By connecting the first inputs with either the ramp potential or with the further ramp potential, correlated double sampling can be carried out. The further ramp potential can in this case be employed as the reset ramp. This further reduces the noise during readout.

According to at least one embodiment of the image sensor, for each column the second input of the comparator of the first ADC is connected with the column bus of the respective column via a capacitor. This can mean, that for each column between the second input of the comparator of the first ADC and the column bus a capacitor is arranged. In this way, charges accumulated by a pixel of the column can be provided to the second input of the comparator of the first ADC.

According to at least one embodiment of the image sensor, for each column the column bus and/or the reference potential is connected with a respective sample capacitor of the readout circuit via a switch. The readout circuit can comprise one sample capacitor for each column, respectively. The sample capacitors can each be configured to store charges that are transferred to the sample capacitors. Each sample capacitor can have a terminal that is connected to ground. The sample capacitors can advantageously be employed to store charges that are transferred from either optically shielded pixels or from the reference potential. This enables to read out optically shielded pixels and/or transfer charges from the reference potential and to store the transferred charges on the sample capacitors. In a next step, the voltage value applied to the sample capacitors can be converted into a digital value by the second ADCs. This enables to remove the detected noise from the signals provided by pixels that are exposed to radiation.

According to at least one embodiment of the image sensor, the sample capacitors assigned to the different columns are connected with each other. This can mean that all sample capacitors are connected with each other. For each column one connection node can be arranged between the switch and the second ADC. The connection nodes of the columns can be connected with each other in series. In this way, the sample capacitors of the different columns are connected with each other. Connecting the sample capacitors with each other enables averaging the signals that are provided to the sample capacitors. Thus, each sample capacitor can be configured to store or hold the average of the signals that are provided to all sample capacitors. In this way, each capacitor can be configured to store the average of detected noise. This has the advantage that by converting this noise signal into a digital signal by the second ADCs enables to subtract the noise from signals detected by pixels exposed to radiation. This reduces the noise during the readout process of the image sensor.

According to at least one embodiment of the image sensor, for each column the sample capacitor is connected with the second ADC via a capacitor. For each column the sample capacitor can be connected to a further connection node that is arranged between the connection node and the second ADC. For each column one capacitor can be arranged between the further connection node and the second input of the comparator of the second ADC. Thus, charges stored on or hold by the sample capacitor can be transferred to the comparator of the second ADC via the second input.

According to at least one embodiment of the image sensor, for each column the second ADC is connectable with at least one of the column bus and the reference potential via a switch. In particular, for each column the second input of the comparator of the second ADC is connectable with at least one of the column bus and the reference potential via one switch. In this way, the second ADC receives the same noise from the shared components as the first ADC.

According to at least one embodiment of the image sensor, the readout circuit is configured to subtract an output value of the second ADC from an output value of the first ADC for each column and/or the readout circuit is configured to subtract an averaged output value of the second ADCs from an output value of the first ADC for each column. An output value of the second ADC can be the digital value of the noise provided to the second ADC. An output value of the first ADC can be the digital value of an analog signal detected by a pixel exposed to radiation. By subtracting the output value of the second ADC from the output value of the first ADC, noise is removed from the signal detected by the pixel exposed to radiation.

According to at least one embodiment of the image sensor, the pixel array comprises at least one further column of pixels, at least some of the pixels of the further column are connected with a common further column bus, and the further column bus is connected with the first ADC that is assigned to one of the columns. The further column can have the same setup and/or the same features as one of the columns. The image sensor does not comprise a separate first ADC and second ADC for the further column. Thus, the further column shares at least the first ADC with one of the columns. In this way, advantageously, in total less ADCs are required for the image sensor. Thus, the image sensor can have a compact size.

According to at least one embodiment of the image sensor, the pixel array comprises at least one further column of pixels, and the further column shares the first ADC and the second ADC with one of the columns.

According to at least one embodiment of the image sensor, the pixel array comprises at least two further columns of pixels, and the further columns share the second ADC with one of the columns. The image sensor can comprise a second ADC that is assigned to at least one column and at least one further column. For example, one column and at least two further columns share one second ADC.

Furthermore, a method for operating an image sensor is provided. The image sensor can be employed for the method for operating an image sensor described herein. This means all features disclosed for the image sensor are also disclosed for the method for operating an image sensor and vice-versa.

According to at least one embodiment of the method for operating an image sensor, the method comprises reading out signals detected by at least some pixels of a plurality of pixels of a pixel array of the image sensor, wherein each pixel comprises a photosensitive element, wherein the signals are read out by a readout circuit for each of at least two columns of pixels of the pixel array, and wherein for each column the pixels whose signals are read out are connected with a common column bus. The signals of different pixels can be read out after one another.

The method for operating an image sensor further comprises reading out further signals by the readout circuit. For each column the readout circuit comprises a first ADC and a second ADC. Reading out the signals comprises transferring the signal of at least one pixel via the column bus to the respective first ADC for each column. The signals that are read out can be transferred to the second input of the comparator of the respective first ADC in each case.

Reading out the further signals comprises connecting the second ADC with at least one of the respective column bus and a reference potential for each column or reading out the further signals comprises transferring the further signal detected by at least one optically shielded pixel of the pixel array to the second ADC for each column. This means, there are different possibilities how the further signals can be read out.

For the case that reading out the further signals comprises connecting the second ADC with the column bus of the respective column, the further signals are signals provided by an optically shielded pixel of the respective column. For the case that reading out the further signals comprises connecting the second ADC with the reference potential, the further signals are signals that are transferred to the second ADC once that the second ADC is connected with the reference potential. For the case that reading out the further signals comprises connecting the second ADC with the respective column bus and the reference potential, the further signals are signals provided by at least one optically shielded pixel of the respective column superimposed with the voltage level of the reference potential. For the case that reading out the further signals comprises transferring the further signal detected by at least one optically shielded pixel of the pixel array to the second ADC for each column, the further signal is a signal that the optically shielded pixel detects.

With these different possibilities it is possible to remove noise from a signal to be detected which can be a signal detected by a pixel exposed to radiation. As described above, noise arising from impacts of a ramp signal provided to ADCs of the readout circuit, for example the first ADCs, and noise arising from other components that are shared by the first ADCs and the second ADCs is transferred to the second ADCs in the form of further signals and in a next step the further signals can be subtracted from the signals provided by the first ADCs. In this way, noise during readout of the image sensor is reduced.

According to at least one embodiment of the method, for each column an output value of the second ADC is subtracted from an output value of the first ADC. An output value of the second ADC can be a digital value of a further signal. An output value of the first ADC can be a digital value of a signal detected by a pixel exposed to radiation. By subtracting the output value of the second ADC from the output value of the first ADC, noise is removed from the signal detected by the pixel exposed to radiation.

According to at least one embodiment of the method, the signal of the at least one pixel of one column and the further signal detected by the at least one optically shielded pixel are read out simultaneously. In this case, the pixel for which the signal is read out is exposed to radiation during acquisition of the signal. The second ADC is not connected with the column bus but with at least one optically shielded pixel. During the readout of the signal and the further signal several components of the readout circuit are shared for both readout processes. Therefore, the further signal comprises the noise that arises during this readout process for exactly the time at which the signal is read out. This means, any correlated noise is detected by the exposed pixel and the optically shielded pixel. Therefore, by subtracting the output value of the second ADC from the output value of the first ADC, the noise introduced by the shared components of the readout circuit can be advantageously removed from the output value of the first ADC.

According to at least one embodiment of the method, the further signals are averaged for the at least two columns before the further signals are read out. This is achieved by connecting the sample capacitors with each other. Averaging the further signals can have the advantage that the average noise can be removed from signals detected from pixels that are exposed to radiation.

According to at least one embodiment of the method, reading out the signals comprises correlated double sampling. This can be enabled by connecting the first input of the comparator of the first ADC and the first input of the comparator of the second ADC with a ramp potential and in another step with a further ramp potential.

According to at least one embodiment of the method, output values of the second ADCs are averaged to give an average output value and for each column the averaged output value is subtracted from an output value of the first ADC. Also in this way noise is removed from the output value of the first ADC.

BRIEF DESCRIPTION OF THE DRAWINGS

The following description of figures may further illustrate and explain exemplary embodiments. Components that are functionally identical or have an identical effect are denoted by identical references. Identical or effectively identical components might be described only with respect to the figures where they occur first. Their description is not necessarily repeated in successive figures.

DETAILED DESCRIPTION

Figure 1:
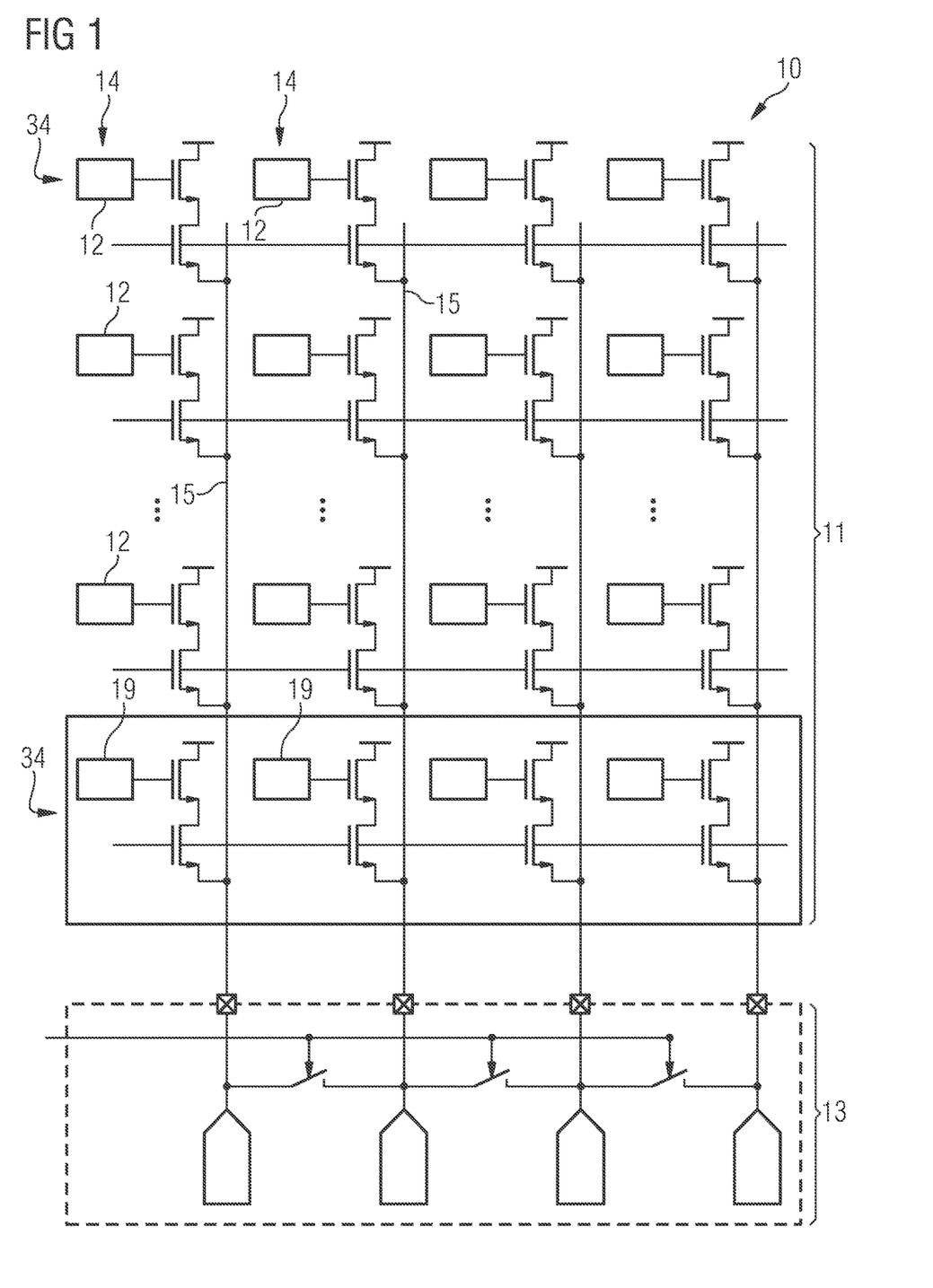
FIG. 1 shows an exemplary embodiment of the image sensor.

In FIG. 1 an exemplary embodiment of the image sensor 10 is shown. The image sensor 10 comprises a pixel array 11 comprising a plurality of pixels 12. Each pixel 12 comprises a photosensitive element. The pixels 12 of the pixel array 11 are arranged in columns 14 and rows 34. As an example four columns 14 and four rows 34 are shown in FIG. 1. It is however also possible that the pixel array 11 comprises more than four or less than four columns 14 and/or more than four or less than four rows 34 of pixels 12. Within each column 14 of the pixel array 11 at least some of the pixels 12 of the column 14 are connected with a common column bus 15, respectively. In the embodiment shown in FIG. 1 for each column 14 pixels 12 of the column 14 are connected with the column bus 15 of the respective column 14.

Within each column 14 at least one pixel 19 is optically shielded. In the embodiment shown in FIG. 1 for each column 14 one pixel 19 is optically shielded. The optically shielded pixels 19 are arranged within one row 34. In FIG. 1, the optically shielded pixels 19 are arranged in the bottom row 34 of the pixel array 11.

The image sensor 10 further comprises a readout circuit 13. Each column bus 15 is connected with the readout circuit 13. The setup of the readout circuit 13 is shown in more detail in FIGS. 2, 3, 4, 5 and 6.

Figure 2:
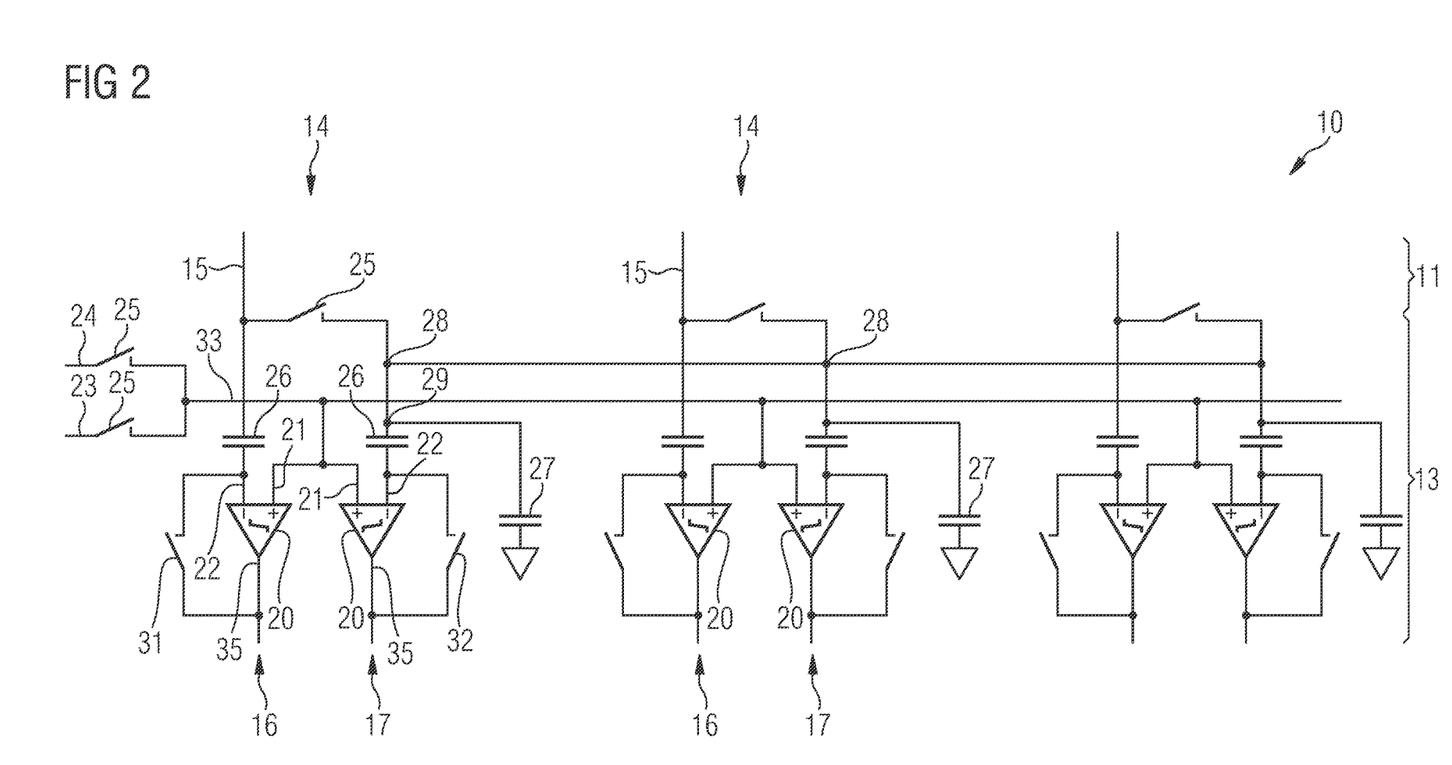
FIGS. 2, 3, 4, 5 and 6 show parts of exemplary embodiments of the image sensor. Furthermore, with FIGS. 2, 3, 4, 5 and 6 an exemplary embodiment of the method for operating an image sensor is described.

FIG. 2 shows a part of an exemplary embodiment of the image sensor 10. The pixels 12 of the pixel array 11 can be arranged as shown in FIG. 1. In FIG. 2 mainly a part of the readout circuit 13 is shown. Each column bus 15 is connected with the readout circuit 13.

For each column 14 the readout circuit 13 comprises a first ADC 16 and a second ADC 17. Each first ADC 16 comprises a comparator 20 with a first input 21 and a second input 22. For each first ADC 16 the first input 21 of the comparator 20 is connectable to a ramp potential 23 and a comparison potential 24 which can be a reference potential. For this purpose for each first ADC 16 the first input 21 of the comparator 20 is connected with a connection bus 33. The first inputs 21 of the comparators 20 of the first ADCs 16 are connected in series along the connection bus 33. The connection bus 33 is connected with the ramp potential 23 via a switch 25. The connection bus 33 is connected with the further potential via another switch 25. The two switches 25 are controllable independently from each other. Once the switch 25 between the comparison potential 24 and the first inputs 21 of the comparators 20 of the first ADCs 16 is closed, a reference voltage is applied to the first inputs 21 of the comparator 20 of the first ADCs 16. Afterwards, the switch 25 between the ramp potential 23 and the connection bus 33 is closed and two ramp voltages are applied to the first inputs 21 of the comparators 20 of the first ADCs 16 after one another. The two different ramp voltages can be employed to carry out correlated double sampling. The connection to the comparison potential 24 is employed for analog correlated double sampling.

For each column 14 the second input 22 of the comparator 20 of the first ADC 16 is connected with the column bus 15 of the respective column 14 via a capacitor 26. For each first ADC 16 the comparator 20 also comprises an output 35. For each first ADC 16 the second input 22 of the comparator 20 and the output 35 of the comparator 20 are connected via a first switch 31.

Each second ADC 17 comprises a comparator 20 with a first input 21 and a second input 22. For each column 14 the first input 21 of the comparator 20 of the second ADC 17 is connected with the connection bus 33. For each column 14 the second input 22 of the comparator 20 of the second ADC 17 is connectable with the column bus 15 of the respective column 14. For each column 14 the second input 22 of the comparator 20 of the second ADC 17 connected with a connection node 28 via a capacitor 26. For each column 14 between the connection node 28 and the column bus 15 a switch 25 is arranged. Via the switch 25 the second ADC 17 is connectable with the column bus 15. The connection nodes 28 of the different columns 14 can be connected with each other in series. However, it is also possible that the connection nodes 28 of the different columns 14 are not connected with each other. For each column 14 between the second input 22 of the comparator 20 of the second ADC 17 and the connection node 28 a further connection node 29 is arranged. The further connection node 29 is connected with a sample capacitor 27 which is also connected to ground. The sample capacitors 27 assigned to the different columns 14 can be connected with each other via the connection nodes 28. Also for each column 14 the sample capacitor 27 is connected with the second ADC 17 via a capacitor 26. For each second ADC 17 the comparator 20 comprises an output 35. For each second ADC 17 the second input 22 of the comparator 20 is connected with the output 35 of the comparator 20 via a second switch 32.

Figure 3:
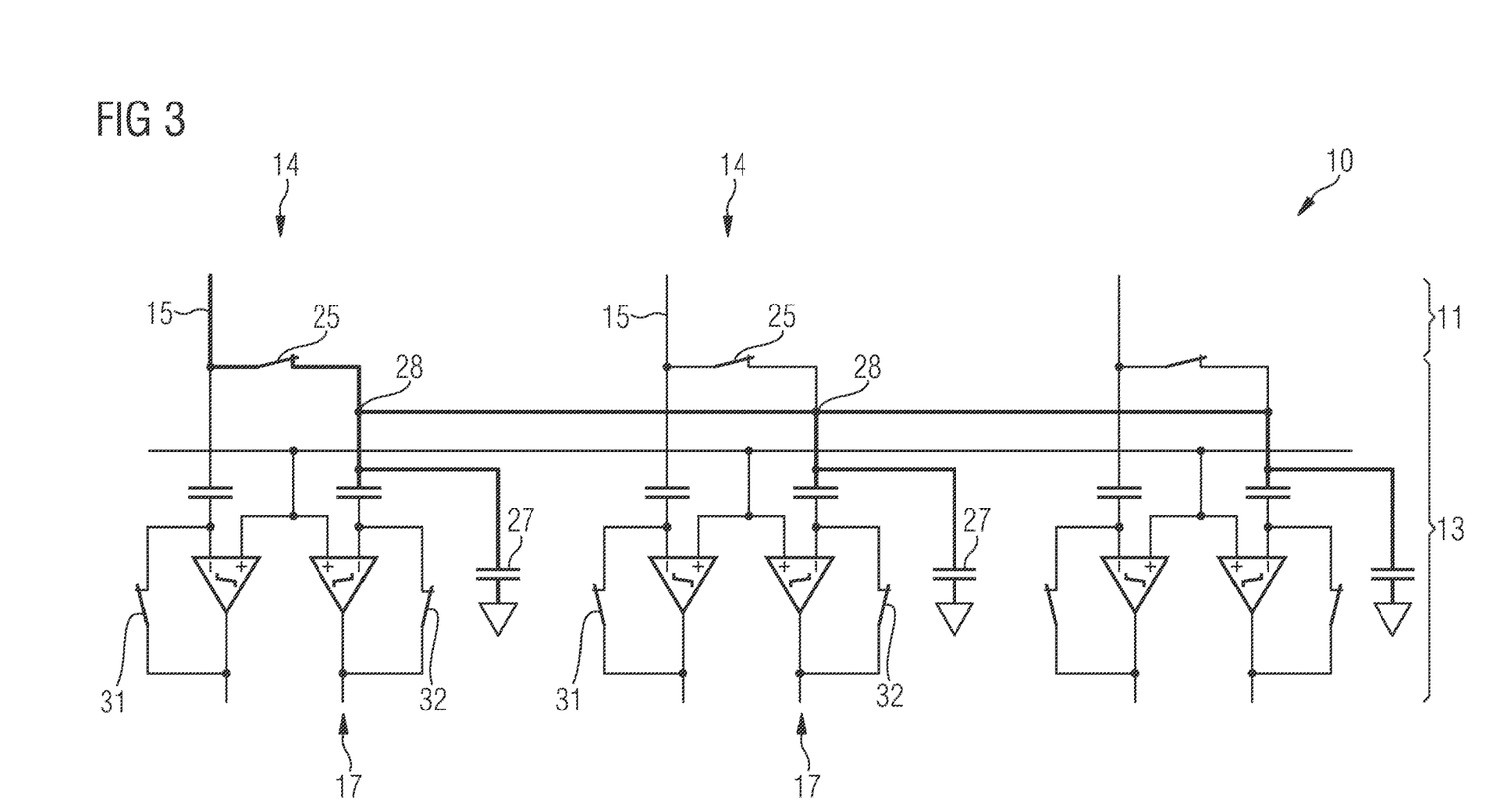

With FIG. 3 an exemplary embodiment of the method for operating an image sensor 10 is described. FIG. 3 shows the embodiment of the image sensor 10 of FIG. 2. In the first step of the method shown in FIG. 3 further signals are read out by the readout circuit 13. The further signals are the signals that are detected by optically shielded pixels 19. In comparison, signals are the signals that are detected by pixels 12 exposed to radiation.

For reading out further signals, for each column 14 the second ADC 17 is connected with the column bus 15 of the respective column 14. This is achieved by closing the switch 25 arranged between the column bus 15 and the connection node 28 for each column 14. Furthermore, the first switch 31 and the second switch 32 are closed. The further signals detected by at least one optically shielded pixel 19 of the column 14 are transferred to the sample capacitor 27 for each column 14. Moreover, since the sample capacitors 27 are connected with each other, the further signals of all columns 14 are averaged on the sample capacitors 27 before the further signals are read out.

Figure 4:
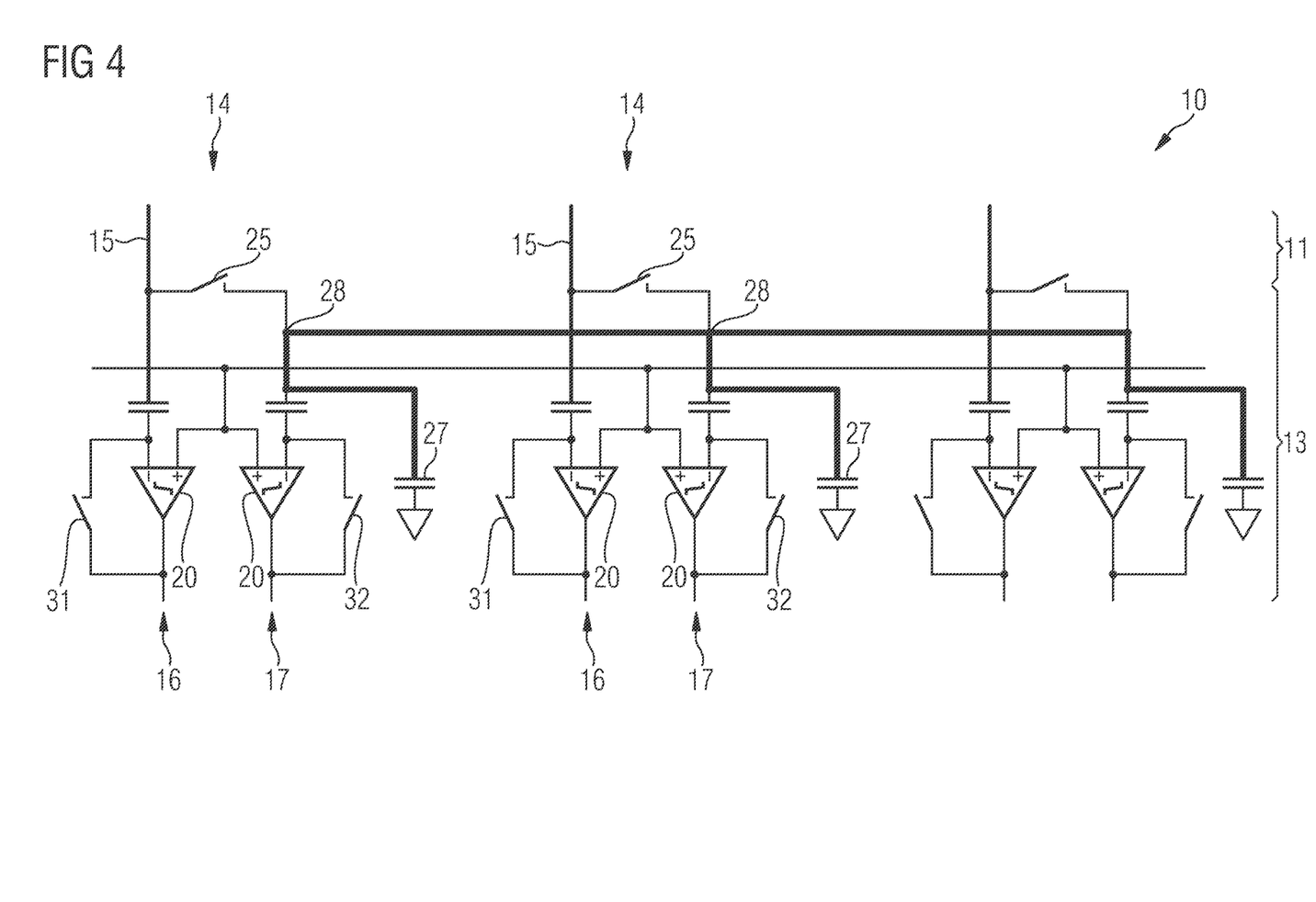

With FIG. 4 a next step of the method is described. FIG. 4 shows the same embodiment of the image sensor 10 as FIG. 3. In the method step shown in FIG. 4 the further signals transferred to the sample capacitors 27 are hold by the sample capacitors 27. For each column 14 the switch 25 between the column bus 15 and the connection node 28 is opened. Thus, no further charges are transferred to the sample capacitors 27. After opening the switch 25 between the column bus 15 and the connection node 28 for each column 14, the second switch 32 is opened for each column 14. At next, signals detected by pixels 12 exposed to radiation are read out by the readout circuit 13. This means, for each column 14 at least one pixel 12 is exposed to radiation and the signals detected by this pixel 12 are transferred to the column bus 15. For this purpose, for each column 14 the first switch 31 is opened. For each column 14 all pixels 12 that are not optically shielded are connected with the common column bus 15. For reading out the signals, the signals of the at least one exposed pixel 12 are transferred via the column bus 15 to the respective first ADC 16 for each column 14. The signals provided to the first ADC 16 are converted into digital signals by the first ADC 16. This is achieved by at first closing the switch 25 between the comparison potential 24 and the first ADC 16 and by thus carrying out analog correlated double sampling. In a next step, the signals provided to the first ADC 16 are compared to the voltage levels provided by the ramp potential 23 by the comparator 20 of the first ADC 16. Thus, correlated double sampling is carried out. The digital signals are provided in an output value by the first ADC 16. At the same time, for each column 14 the charge stored on the sample capacitor 27 is transferred to the second ADC 17 where the further signals are converted into digital signals. The digital signals are provided in an output value by the second ADC 17. Therefore, the signal of the at least one exposed pixel 12 of one column 14 and the further signal detected by the at least one optically shielded pixel 19 are read out simultaneously.

Within the readout circuit 13 the output value of the second ADC 17 is subtracted from the output value of the first ADC 16. This means, the readout circuit 13 is configured to subtract the output value of the second ADC 17 from the output value of the first ADC 16 for each column 14. In this way, noise is removed from the digital value of the signals detected by pixels 12 exposed to radiation. This process is carried out twice, once for a connection to the comparison potential 24 and once for a connection to the ramp potential 23. For the connection to the comparison potential 24 the output value of the comparator 20 of the second ADC 17 is subtracted from the output value of the comparator 20 of the first ADC 16. Also for the connection to the ramp potential 23 the output value of the comparator 20 of the second ADC 17 is subtracted from the output value of the comparator 20 of the first ADC 16. Finally, these two final values are subtracted from each other according to correlated double sampling. Thus, in both subtraction steps, noise introduced by shared components of the readout circuit 13 is removed from the output value of the first ADC 16. The subtraction can be done in a counter or digitally. If there is a correlation between noise arising during the readout of the further signals and noise arising during the readout of the signals, this correlated noise is removed by the method described herein.

It is also possible that output values of the second ADCs 17 are averaged to give an average output value and for each column 14 the averaged output value is subtracted from an output value of the first ADC 16.

Figure 5:
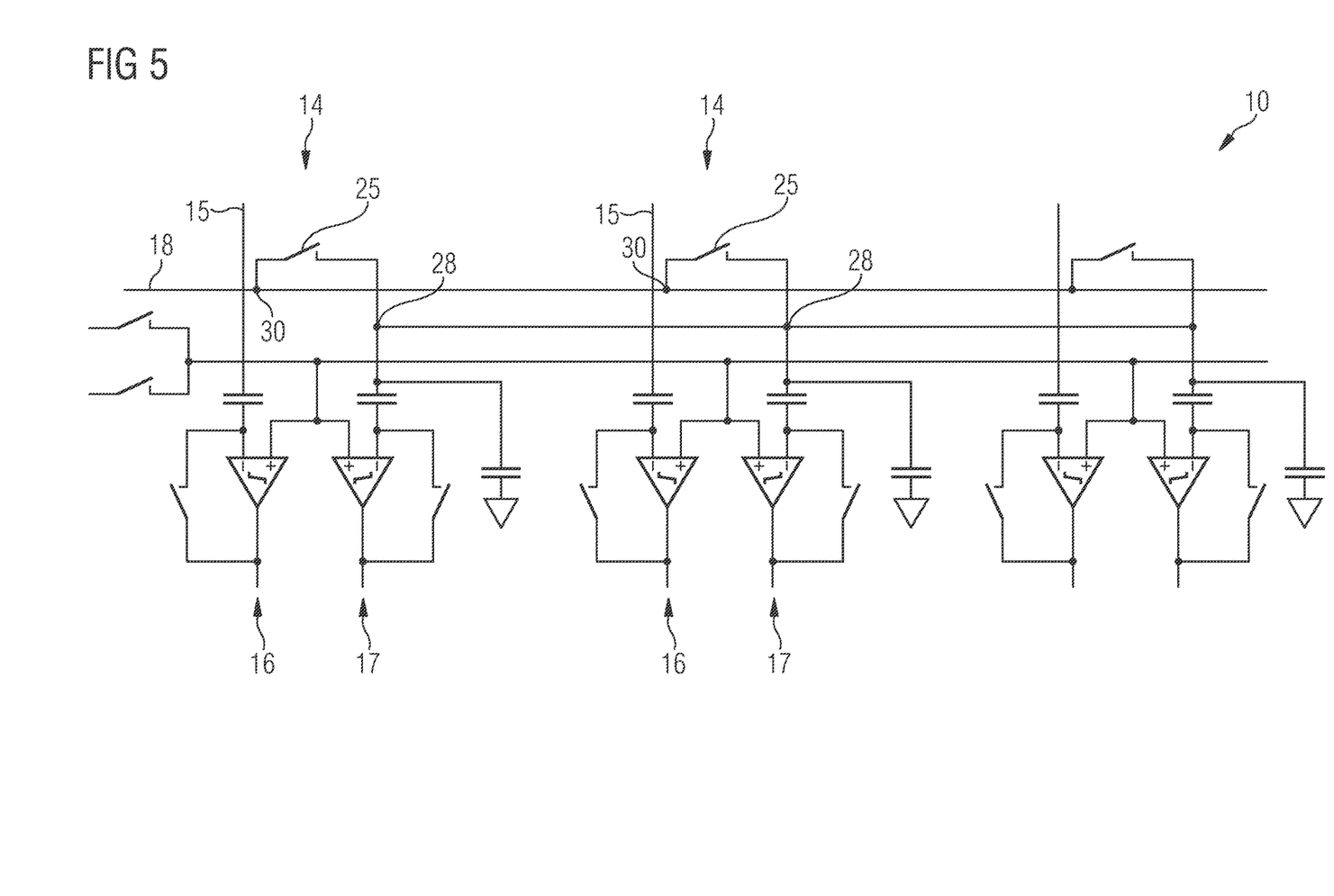

In FIG. 5 a part of another exemplary embodiment of the image sensor 10 is shown. The only difference to the set up shown in FIG. 3 is, that for each column 14 a switch 25 is arranged between a reference potential 18 and the connection node 28.

For each column 14 the connection node 28 is not connectable with the column bus 15. The column bus 15 is connected with the first ADC 16. This means, for each column 14 the second ADC 17 is connectable with the reference potential 18 via a switch 25. For each column 14 between the switch 25 and the reference potential 18 a circuit node 30 is arranged. The circuit nodes 30 of the different columns 14 are connected with each other in series.

Furthermore, with FIG. 5 another exemplary embodiment of the method is described. The only difference to the method described with FIG. 4 is that for reading out further signals for each column 14 the second ADC 17 is connected with the reference potential 18.

Figure 6:
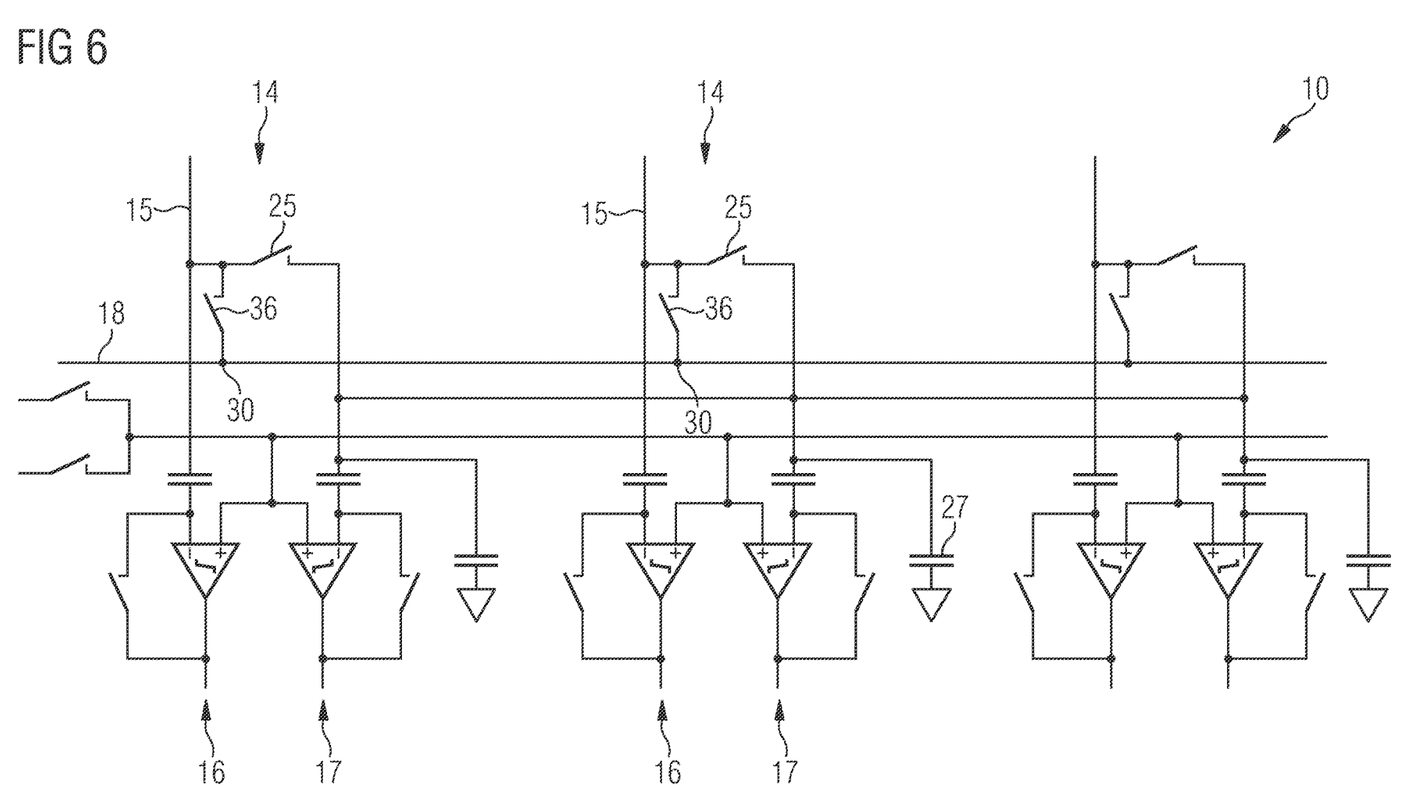

In FIG. 6 a part of another exemplary embodiment of the image sensor 10 is shown. The embodiment of FIG. 6 is a combination of the embodiments shown in FIGS. 3 and 5. For each column 14 the second ADC 17 is connectable with the column bus 15 of the column 14 via a switch 25. Furthermore, the reference potential 18 is connectable to the column bus 15 via a further switch 36. Thus, for each column 14 the second ADC 17 is connectable with the column bus 15 and the reference potential 18. For each column 14 between the further switch 36 and the reference potential 18 a circuit node 30 is arranged. The circuit nodes 30 of the different columns 14 are connected with each other in series.

Furthermore, with FIG. 6 another exemplary embodiment of the method is described. A difference to the embodiment described with FIG. 5 is that for reading out the further signals the second ADC 17 is connected with the respective column bus 15 and the reference potential 18 for each column 14. Another difference to the embodiment described with FIG. 5 is that for reading out the signals the reference potential 18 can be connected to the column bus 15. This can have the advantage that the column bus 15 is always pulled to the same reference potential 18 level for each readout.

Figure 7:
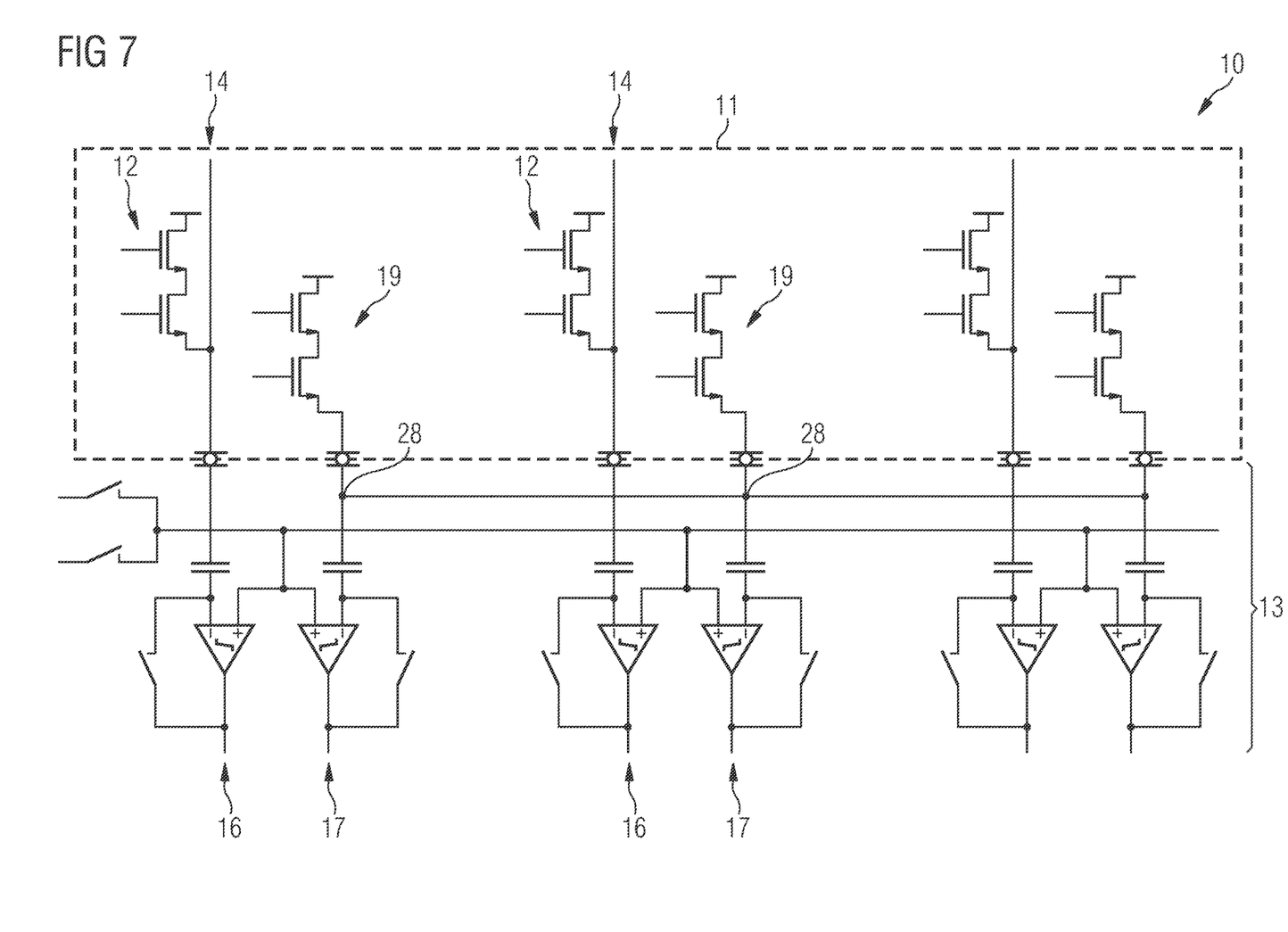
FIGS. 7, 8 and 9 show further exemplary embodiments of the image sensor.

FIG. 7 shows another exemplary embodiment of the image sensor 10. As an example the pixel array 11 comprises three columns 14. It is however also possible that the pixel array 11 comprises less than three columns 14 or more than three columns 14. As an example each column 14 comprises one pixel 12 that is configured to be exposed to radiation. It is also possible that each column 14 comprises more than one pixel 12 that is configured to be exposed to radiation. For each column 14 the pixel array 11 also comprises one optically shielded pixel 19. It is also possible that the pixel array 11 comprises more than one optically shielded pixel 19 for each column 14.

For each column 14 the pixel 12 that is configured to be exposed to radiation is connected with the first ADC 16 as described with FIG. 2. For each column 14 the optically shielded pixel 19 is directly connected with the connection node 28. This means, for each column 14 the second ADC 17 is connected with one optically shielded pixel 19 of the pixel array 11. The connection nodes 28 of the different columns 14 can be connected with each other in series. However, it is also possible that the connection nodes 28 of the different columns 14 are not connected with each other. The readout circuit 13 does not comprise any sample capacitors 27 that are connected to the second ADCs 17.

With FIG. 7 also another exemplary embodiment of the method is described. For reading out the further signals which means that signals detected by the optically shielded pixels 19 are transferred to the readout circuit 13, for each column 14 the further signal detected by the optically shielded pixel 19 is transferred to the second ADC 17. The further signals are not stored on sample capacitors 27. Instead, the readout of the further signals and the readout of the signals takes place at the same time. The readout of the signals takes place as described with FIGS. 3 and 4. The readout of the further signals takes place in the same way as the readout of the signals with the difference that the second ADCs 17 are employed for reading out the further signals.

Figure 8:
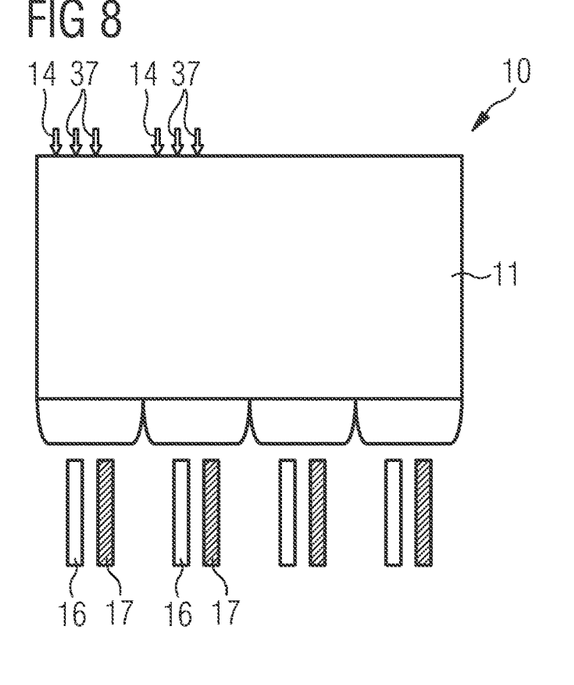

FIG. 8 shows another exemplary embodiment of the image sensor 10. The pixel array 11 comprises several columns 14 and several further columns 37. In each case, one column 14 and one or more than one further column 37 share one first ADC 16 and one second ADC 17. In this way, in total less ADCs 16, 17 are required for the image sensor 10 than for example for the embodiment shown in FIG. 2.

Figure 9:
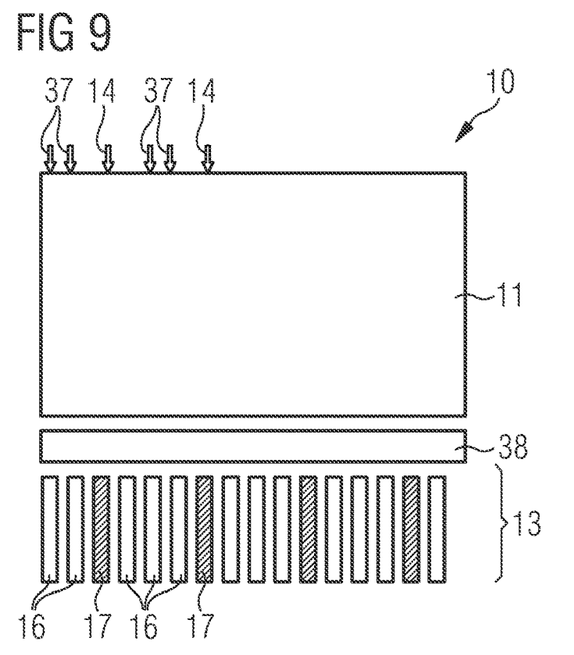

FIG. 9 shows another exemplary embodiment of the image sensor 10. The pixel array 11 comprises several columns 14 and several further columns 37. Within each further column 37 at least some of the pixels of the further column 37 are connected with a common further column bus, respectively. For each further column 37 the readout circuit 13 comprises one first ADC 16. For each further column 37 the first ADC 16 is connected with the further column bus. The image sensor 10 comprises one second ADC 17 for a group comprising one column 14 and at least one further column 37, for example three further columns 37. Thus, in total less second ADCs 17 are required for the image sensor 10 than for example for the embodiment shown in FIG. 2. Between the pixel array 11 and the readout circuit 13, a scrambling block 38 is arranged which is configured to randomize the connection between the columns 14 and further columns 37 and the ADCs 16, 17 per row of the pixel array 11.

Figure 10:
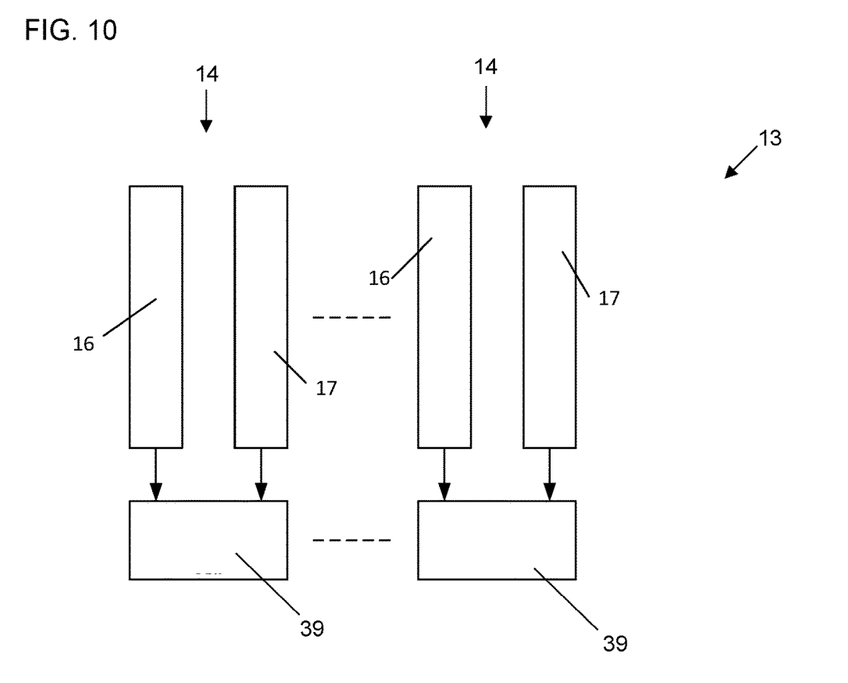
FIGS. 10 and 11 show parts of further exemplary embodiments of the image sensor.

FIG. 10 shows a part of another exemplary embodiment of the image sensor 10. The readout circuit 13 comprises a digital processing cell 39 for each pair of one first ADC 16 and one second ADC 17, this means for each column 14. Each digital processing cell 39 is configured to subtract the output value of the second ADC 17 from the output value of the first ADC 16. Each digital processing cell 39 can also be configured to adjust the black level. The digital processing cell 39 an be a processor or a digital signal processor (DSP), for example.

Figure 11:
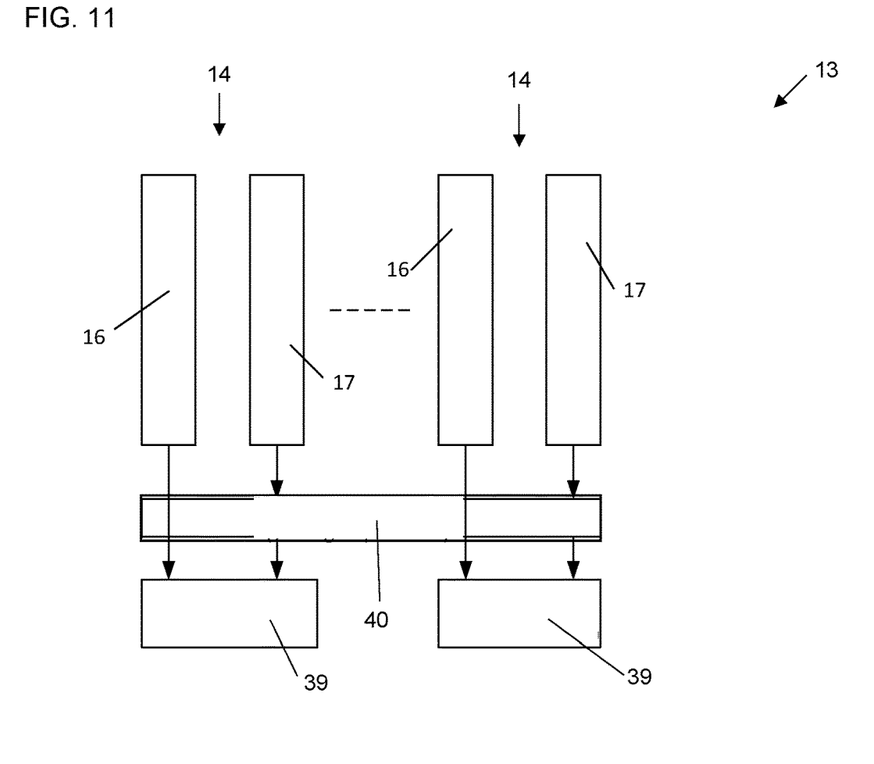

FIG. 11 shows a part of another exemplary embodiment of the image sensor 10. In comparison to the embodiment shown in FIG. 10, in FIG. 11 output values of the second ADCs 17 are averaged to give an average output value and for each column 14 the averaged output value is subtracted from an output value of the first ADC 16. The readout circuit 13 comprises a further digital processing cell 40 that is connected with all second ADCs 17. The further digital processing cell 40 is configured to average the output values of the second ADCs 17 or determine the median of the output values of the second ADCs 17. The subtraction is then carried out for each column 14 as described with FIG. 10.

For FIGS. 10 and 11 it is also possible that the digital processing cells 39 are comprised by a digital block that performs the tasks of the digital processing cells 39.

It will be appreciated that the disclosure is not limited to the disclosed embodiments and to what has been particularly shown and described hereinabove. Rather, features recited in separate dependent claims or in the description may advantageously be combined. Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment. The appearances of the phrase "for example," "in an example," or "in some examples" are not necessarily all referring to the same example.

Furthermore, the scope of the disclosure includes those variations and modifications, which will be apparent to those skilled in the art. The term "comprising", insofar it was used in the claims or in the description, does not exclude other elements or steps of a corresponding feature or procedure. In case that the terms "a" or "an" were used in conjunction with features, they do not exclude a plurality of such features. Moreover, any reference signs in the claims should not be construed as limiting the scope. As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner. For the purposes of the present disclosure, the phrase "A and/or B" or "at least one of A and B" means (A), (B), or (A and B). For the purposes of the present disclosure, the phrase at least one of "A, B, and C" means (A), (B), (C), (A and B), (A and C), (B and C), or (A, B, and C).

It will be understood that when an element is referred to as being "connected" or "coupled" to another element, it can be physically connected or coupled to the other element such that current and/or electromagnetic radiation (e.g., a signal) can flow along a conductive path formed by the elements. Intervening conductive, inductive, or capacitive elements may be present between the element and the other element when the elements are described as being coupled or connected to one another. Further, when coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

As utilized herein, terms "module", "component," "system," "circuit," "element," "slice," "circuitry," and the like are intended to refer to a set of one or more electronic components, a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuits can reside within the same circuitry, and circuitry can be localized on one computer and/or distributed between two or more computers. A set of elements or a set of other circuits can be described herein, in which the term "set" can be interpreted as "one or more."

REFERENCES

10: image sensor
11: pixel array
12: pixel
13: readout circuit
14: column
15: column bus
16: first ADC
17: second ADC
18: reference potential
19: optically shielded pixel
20: comparator
21: first input
22: second input
23: ramp potential
24: comparison potential
25: switch
26: capacitor
27: sample capacitor
28: connection node
29: further connection node 30: circuit node
31: first switch
32: second switch
33: connection bus
34: row
35: output
36: further switch
37: further column
38: scrambling block
39: digital processing cell
40: further digital processing cell

The invention claimed is:

1. An image sensor comprising:
a pixel array comprising a plurality of pixels each comprising a photosensitive element, and
a readout circuit,
wherein
the pixel array comprises at least two columns of pixels, and within each column of pixels, one or more of the pixels of the column are connected to a common column bus, respectively,
for each column of pixels, the readout circuit comprises a first analog-to-digital converter (ADC) and a second ADC,
for each column of pixels, the first ADC is connected with the common column bus, and
for each column of pixels, the second ADC is connectable with the common column bus and/or a reference potential, or the second ADC is connected with one optically shielded pixel of the pixel array.

2. The image sensor according to claim 1, wherein within each column of pixels at least one pixel is optically shielded.

3. The image sensor according to claim 2, wherein the optically shielded pixels are arranged in a row of the pixel array.

4. The image sensor according to claim 1, wherein for each column the first ADC comprises a comparator having a first input and a second input and the second ADC comprises a comparator having a first input and a second input.

5. The image sensor according to claim 4, wherein for each column of pixels the first input of the comparator of the first ADC and the first input of the comparator of the second ADC are connected with a ramp potential via a switch.

6. The image sensor according to claim 4, wherein for each column of pixels, the second input of the comparator of the first ADC is connected with the common column bus of the respective column via a capacitor.

7. The image sensor according to claim 1, wherein for each column of pixels the common column bus and/or the reference potential is connected with a respective sample capacitor of the readout circuit via a switch.

8. The image sensor according to claim 7, wherein the sample capacitors assigned to the different columns of pixels are connected with each other.

9. The image sensor according to claim 7, wherein for each column of pixels the sample capacitor is connected with the second ADC via a capacitor.

10. The image sensor according to claim 1, wherein for each column of pixels the second ADC is connectable with the common column bus and/or the reference potential via a switch.

11. The image sensor according to claim 1, wherein the readout circuit is configured to subtract an output value of the second ADC from an output value of the first ADC for each column of pixels and/or the readout circuit is configured to subtract an averaged output value of the second ADCs from an output value of the first ADC for each column of pixels.

12. The image sensor according to claim 1, wherein the pixel array comprises at least one further column of pixels, one or more of the pixels of the further column of pixels are connected with a further common column bus, and the further common column bus is connected with the first ADC that is assigned to one of the columns of pixels.

13. The image sensor according to claim 1, wherein the pixel array comprises at least one further column of pixels, and the further column of pixels shares the first ADC and the second ADC with one of the other column of pixels.

14. The image sensor according to claim 1, wherein the pixel array comprises at least two further columns of pixels, and the further columns of pixels share the second ADC with one of the other columns of pixels.

15. A method for operating an image sensor, the method comprising the steps of:
reading out signals detected by one or more pixels of a plurality of pixels of a pixel array of the image sensor, wherein each pixel comprises a photosensitive element, wherein the signals are read out by a readout circuit for each of at least two columns of pixels of the pixel array, and wherein for each column of pixels the pixels whose signals are read out are connected with a common column bus, and
reading out further signals by the readout circuit,
wherein
for each column of pixels the readout circuit comprises a first analog-to-digital converter (ADC) and a second ADC,
reading out the signals comprises transferring the signal of at least one pixel via the common column bus to the respective first ADC for each column, and
reading out the further signals comprises connecting the second ADC with at least one of the respective common column bus and a reference potential for each column of pixels or reading out the further signals comprises transferring the further signal detected by at least one optically shielded pixel of the pixel array to the second ADC for each column of pixels.

16. The method for operating an image sensor according to claim 15, wherein for each column of pixels an output value of the second ADC is subtracted from an output value of the first ADC.

17. The method for operating an image sensor according to claim 15, wherein the signal of the at least one pixel of one column of pixels and the further signal detected by the at least one optically shielded pixel are read out simultaneously.

18. The method for operating an image sensor according to claim 15, wherein the further signals are averaged for the at least two columns of pixels before the further signals are read out.

19. The method for operating an image sensor according to claim 15, wherein reading out the signals comprises correlated double sampling.

20. The method for operating an image sensor according to claim 15, wherein output values of the second ADCs are averaged to give an average output value and for each column of pixels the averaged output value is subtracted from an output value of the first ADC.

* * * * *